United States Patent Office 2,836,623
Patented May 27, 1958

2,836,623
BIS (HYDROXYPHENYL) ALKENONES AND PROCESS

Kurt J. Rorig, Glenview, Ill., assignor to G. D. Searle & Co., Chicago, Ill., a corporation of Delaware No Drawing. Application March 1, 1956
Serial No. 568,716

7 Claims. (Cl. 260—590)

This invention relates to bis (hydroxyphenyl)-alkenones and processes for the manufacture thereof. More particularly, this invention relates to compounds of the formula

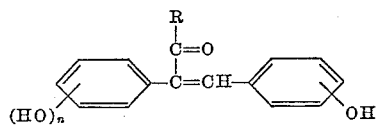

wherein R is a lower alkyl radical, and $n$ is either of the positive integers 1 or 2.

Among the lower alkyl radicals comprehended by R in the foregoing structural formula are methyl, ethyl, propyl, isopropyl, butyl, isobutyl, secondary butyl, tertiary butyl, pentyl, secondary normal pentyl, primary isopentyl, secondary isopentyl, tertiary pentyl, and hexyl radicals.

The compounds of the present disclosure are useful because of their pharmacological activity. Thus, for example, they afford protection against the hyperemia associated with iritis, and block the enhancement of infection which characterizes the well-known adrenal hormones, cortisone and hydrocortisone. Contributing to the therapeutic utility of the claimed compounds is the fact that they are free of undesirable estrogenic side effects.

The subject compounds are generally insoluble in water, but may be dissolved in acetone, butanone, lower esters such as ethyl acetate, benzene, and toluene, and other common organic solvents. The compounds may be administered in solid form as tablets or capsules; dissolved or suspended in aqueous media, they may be given parenterally.

The compounds to which this invention relates may be prepared as follows: An appropriate $\alpha,\beta$-bis (alkoxyphenyl)acrylonitrile of the formula

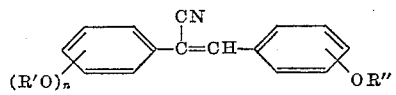

R' and R" being alkyl radicals and $n$ being defined as above, is reacted with an organometallic agent such as RMgX wherein R is a lower alkyl radical of choice, and X is halogen—preferably, but not exclusively, bromine. The reaction is carried out in an ethereal solvent at temperatures ranging from as low as 15° centigrade to the boiling point of the solvent selected. The reaction is completed in upward of 2 hours, whereupon the resultant 1,2-addition product

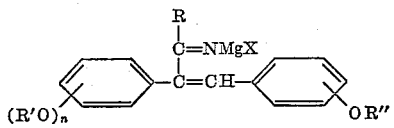

which may—or may not—be isolated, is subjected to hydrolysis with an aqueous mineral acid such that nuclear substitution does not take place. A suitable acid for this purpose is muriatic acid, hydrolysis therewith being effected at temperatures up to 125° centigrade during 10 to 60 minutes. At room temperatures, an isolable imine salt

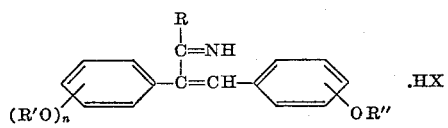

is formed, which, as the reaction temperature is raised, becomes further hydrolyzed to the oxo compound

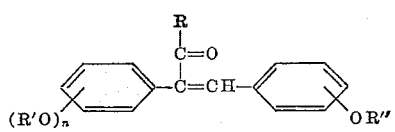

Ordinarily, the foregoing hydrolysis is a single step operation carried out at around 100° centigrade.

The product obtained by this means is converted to the corresponding bis(hydroxyphenyl) compound of this invention by treatment with aluminum bromide in an inert solvent, such as benzene. The indicated dealkylation takes place at temperatures of the order of, for example, 65 to 80° centigrade in from one half to three hours time. Still higher temperatures may be employed for shorter periods of time, and vice versa, if desired. Other solvents found operable are the chlorinated hydrocarbons, such as tetrachlorethane, as also toluene, nitrobenzene, and the like.

A less favored but substantially alternative procedure for effecting the subject ether cleavage makes use of pyridine hydrochloride as the hydrolytic agent. No solvent is required for this reaction, which proceeds smoothly at temperatures between 175 and 220° centigrade in about the same time required by the aluminum bromide method.

A second means of preparing the bis(alkoxy-phenyl) intermediates hereinabove disclosed consists in condensing an appropriate alkyl benzyl ketone

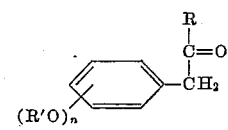

with a selected benzaldehyde

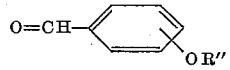

in the presence of hydrogen chloride, using benzene, alcohol, or other inert, non-aqueous, anhydrous solvent as the reaction medium. There is produced, after several hours at 30–80° centigrade, a chloro compound

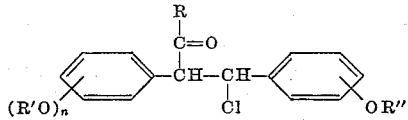

which, heated in vacuo above its melting point, is converted to an aforesaid bis(alkoxyphenyl) compound

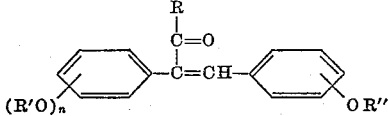

Such compounds, in turn, yield the claimed bisphenolic ketones upon treatment with aluminum bromide or pyridine hydrochloride in accordance with the techniques described above. It is to be remarked that this second preparatory method is subject to adverse influence at the condensation stage as a result of, for example, an electron-releasing meta substituent in the benzaldehyde used.

Throughout the foregoing structural representations, R, R', R", and n have the meanings originally assigned herein.

The following examples describe in detail certain of the compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (° C.), pressures in millimeters (mm.) of mercury, and relative amounts of materials in parts by weight, except as otherwise noted.

EXAMPLE 1

A. *3,4-bis(p-methoxyphenyl)-3-buten-2-ylidenimine hydriodide.*—To a solution of 66 parts of α,β-bis(p-methoxyphenyl)acrylonitrile [descried by Niederl and Ziering, J. Am. Chem. Soc. 64, 885 (1942)], in 2600 parts of warm, thiophene-free benzene is added, with vigorous agitation, 710 parts of anhydrous ether in which is dissolved 33 parts of methylmagnesium iodide. The reactants are heated at reflux temperatures for 50 hours, following which the reaction mixture is decomposed with ice water and a slight excess of muriatic acid. The insoluble yellow solid which results is isolated by filtration and then recrystallized from absolute alcohol to give 3,4 - bis(p-methoxyphenyl-3-buten-2-ylidenimine hydriodide, melting at 180–182° C. The product has the formula

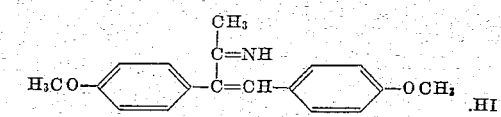

B. *3,4 - bis(p - methoxyphenyl)-3-buten-2-one.* — The imino compound of the preceding part A of this example is hydrolyzed to the corresponding ketone by heating 5 parts thereof in 41 parts of 5% aqueous hydriodic acid for 3 hours at reflux temperatures. The insoluble reaction product is purified by recrystallization from diethyl ether to give white needles of 3,4-bis(p-methoxyphenyl)-3-buten-2-one melting at 72.5–74° C. The product has the formula

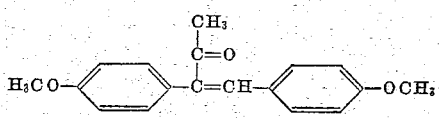

C. *3,4 - bis(p - hydroxyphenyl)-3-buten-2-one.* — To a warm solution of 100 parts of anhydrous aluminum bromide in 1760 parts of dry benzene is added 28 parts of 3,4-bis(p-methoxyphenyl)-3-buten-2-one in 440 parts of dry benzene. The reactants are heated at reflux temperatures with agitation for approximately 30 minutes, following which the reaction mixture is decomposed by incorporation in 2150 parts of 15% aqueous muriatic acid. Addition of 355 parts of diethyl ether, thorough mixing, separation of the organic layer and washing of this layer with water, and—finally—evaporation of solvent by distillation, yields 3,4-bis(p-hydroxyphenyl)-3-buten-2-one as a white residue which, crystallized from ethyl acetate, melts at approximately 159.4–160.7° C. The product has the formula

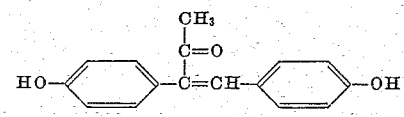

EXAMPLE 2

A. *4-chloro - 3,4 - bis(p-methoxyphenyl)-2-butanone.*— Anhydrous hydrogen chloride is bubbled through a solution of 125 parts of 1-(p-methoxyphenyl)-2-propanone and 104 parts of anisaldehyde in 360 parts of dry benzene at 0–5° C. for 2 hours. Introduction of hydrogen chloride is then stopped and the reaction mixture is allowed to warm to 4° C., at which temperature it is maintained for 20 hours. The precipitate of 4-chloro-3,4-bis(p-methoxyphenyl)-2-butanone which is formed by this process melts at 120–130° C. with evolution of hydrogen chloride. The bulk of the product remains dissolved in the reaction mixture. The product has the formula B. *3,4 - bis(p - methoxyphenyl)-3-buten-2-one.* — The product of the reaction described in part A of this example — including precipitated material — is alternately washed with water and dilute aqueous sodium bicarbonate until neutral to litmus, whereupon benzene is removed by distillation at 15 mm. pressure. The organic residue is then heated to 140° C. at 15 mm. pressure to effect the desired dehydrochlorination. Purification of the halogen-free residue thus obtained is effected by distillation at 0.5 mm. pressure. There results pure 3,4-bis(p-methoxyphenyl)-3-buten-2-one, identical with that prepared by the procedure of Example 1B.

C. *3,4-bis(p-hydroxyphenyl)-3-buten-2-one.*—Cleavage of the methoxy compound of part B of this example, using the technique described in Example 1C above, affords 3,4-bis(p - hydroxyphenyl)-3-buten-2-one, identical with that obtained in the aforesaid Example 1C.

EXAMPLE 3

A. *1,2 - bis(p - methoxyphenyl) - 1 - penten - 3 - one.*— To 270 parts of ethylmagnesium bromide in 2130 parts of anhydrous ether is added 530 parts of powdered α,β-bis(p-methoxyphenyl)acrylonitrile. The reactants are heated at reflux temperatures with agitation for 3 hours, following which the reaction mixture is decomposed by addition of 1000 parts of 10% aqueous muriatic acid. The yellow solid which is precipitated is recovered by filtration and then heated in 10% aqueous muriatic acid at reflux temperatures for 1.25 hours. The resulting white solid is extracted into ether and isolated by evaporation of the solvent. Recrystallization from methyl alcohol affords 1,2-bis(p-methoxyphenyl)-1-penten-3-one which melts at 88–89.5° C. The product has the formula

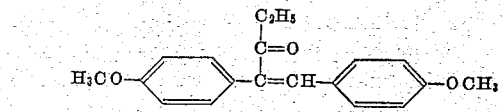

B. *1,2 - bis(p - hydroxyphenyl) - 1 - penten - 3 - one.*— A solution of 7 parts of 1,2-bis(p-methoxyphenyl)-1-penten-3-one in 110 parts of benzene is added to a warm solution of 25 parts of aluminum bromide in 440 parts of benzene. After heating at reflux temperatures for ½ hour and then letting stand without heating for an additional ½ hour, agitation being maintained throughout, the reaction mixture is decomposed by addition of 535 parts of 15% aqueous muriatic acid. The organic layer which results on standing is separated, and the residual aqueous layer is extracted with ether. Extract, and organic material separated earlier, are combined and stripped of solvent by evaporation. The residue is recrystallized from ethyl acetate to give pure, colorless 1,2-bis(p-hydroxyphenyl)-1-penten-3-one, melting at 211–213.5° C. The compound has the formula

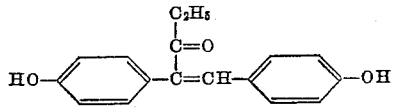

EXAMPLE 4

A. *2 - (3,4 - dimethoxyphenyl) - 1 - (p - methoxyphenyl) - 1 - penten - 3 - ylidenimine hydrobromide.*—To 141 parts of α - (3,4 - dimethoxyphenyl) - β - (p - methoxyphenyl)acrylonitrile [described by Niederl and Ziering, loc. cit.] dissolved in 880 parts of thiophene-free benzene at 65° C. is added 370 parts of anhydrous ether containing 47 parts of ethylmagnesium bromide. The reactants are heated at reflux temperatures for 30 minutes, following which the Grignard complex formed in process is decomposed with ice cold 1% aqueous sulfuric acid. From the resultant mixture is filtered 2-(3,4-dimethoxyphenyl)-1-(p-methoxyphenyl) - 1 - penten-3-ylidenimine hydrobromide which, crystallized from absolute ethyl alcohol, is obtained as an orange-yellow powder melting at 143–145° C. with decomposition. The product has the formula

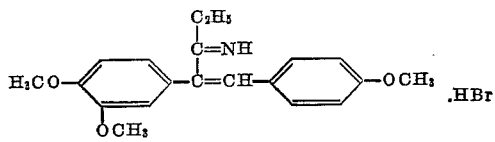

B. *2 - (3,4 - dimethoxyphenyl) - 1 - (p - methoxyphenyl) - 1 - penten - 3 - one.*—The imino hydrobromide of the foregoing part A of this example is hydrolyzed by heating 19 parts thereof to boiling with 95% ethyl alcohol and then permitting the reactants to stand at 25° C. for 4 days. White, fluffy needles of 2-(3,4-dimethoxyphenyl)-1-(p-methoxyphenyl)-1-penten-3-one are formed which, recrystallized from anhydrous ethyl alcohol, melt at approximately 99–100° C. The product has the formula

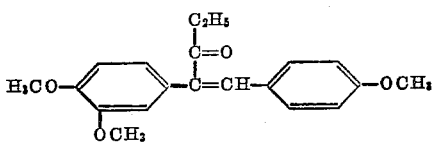

C. *2 - (3,4 - dihydroxyphenyl) - 1 - (p - hydroxyphenyl)-1-penten-3-one.*—Using the technique described in Example 1C above, 25 parts of 2-(3,4-dimethoxyphenyl)-1-(p-methoxyphenyl)-1-penten-3-one is converted to the corresponding phenolic material by treatment with 100 parts of anhydrous aluminum bromide in an aggregate of 2200 parts of dry benzene at reflux temperatures for 30 minutes. The product thus obtained has the formula

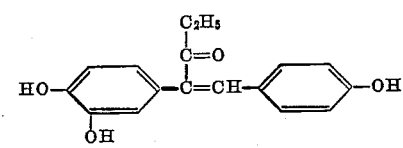

EXAMPLE 5

A. *1,2 - bis(p - methoxyphenyl) - 1 - hexen - 3 - ylidenimine hydrobromide.*—To a mixture of 97 parts of n-propyl magnesium bromide and 710 parts of anhydrous ether is added 133 parts of α,β-bis(p-methoxyphenyl)acrylonitrile. After heating at reflux temperatures for 2 hours, the solution is combined with 545 parts of 18% aqueous hydrobromic acid in order to decompose the Grignard complex produced. An orange-yellow oil is thrown down which solidifies on standing. This solid matter is removed by filtration and recrystallized from absolute ethyl alcohol to give yellow 1,2-bis(p-methoxyphenyl)-1-hexen-3-ylidenimine hydrobromide melting at 145–147° C. The product sinters slightly as the melting point is approached. It has the formula

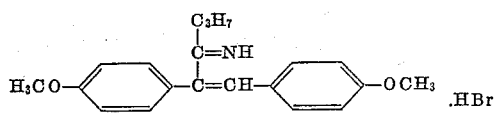

B. *1,2 - bis(p - methoxyphenyl) - 1 - hexen - 3 - one.*—A mixture of 4 parts of the imino hydrobromide of the foregoing part A of this example, 22 parts of 48% aqueous hydrobromic acid, 50 parts of water, and 4 parts of ethyl alcohol is heated at reflux temperatures for 1.5 hours. The resultant solution is cooled and extracted with benzene. Evaporation of solvent from the benzene extract leaves a golden oil which, taken up in ether, comes out again as colorless, massive prisms on cooling. There is thus obtained 1,2-bis(p-methoxyphenyl)-1-hexen-3-one, which melts at 52–55° C. and has the formula

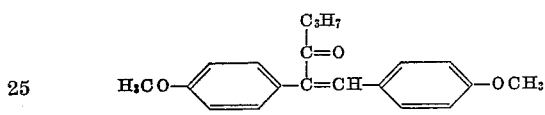

C. *1,2 - bis (p - hydroxyphenyl) - 1 - hexen - 3 - one.*—Treatment of 26 parts of the methoxy compound of the foregoing part B of this example with approximately 100 parts of anhydrous aluminum bromide in 2000 parts of dry benzene yields the corresponding phenolic compound, 1,2-bis(p-hydroxyphenyl)-1-hexen-3-one, having the formula

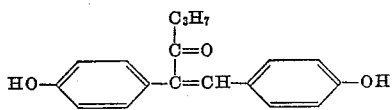

What is claimed is:

1. A compound of the formula

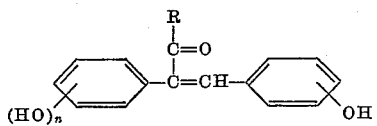

wherein R is a lower alkyl radical, and *n* is a positive integer less than 3.

2. A compound of the formula

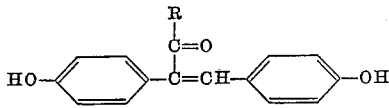

wherein R is a lower alkyl radical.

3. 3,4-bis(p-hydroxyphenyl)-3-buten-2-one.
4. 1,2-bis(p-hydroxyphenyl)-1-penten-3-one.
5. 1,2-bis(p-hydroxyphenyl)-1-hexen-3-one.
6. 2 - (3,4 - dihydroxyphenyl) - 1 - (p - hydroxyphenyl) - 1 - penten - 3 - one.
7. In a process for the manufacture of a compound of the formula

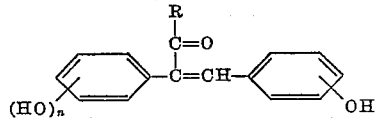

wherein R is a lower alkyl radical, and *n* is a positive integer less than 3, the steps which comprise (1) contacting in ethereal solvent an acrylonitrile of the formula

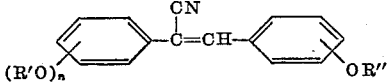

R' and R" being alkyl radicals and *n* being defined as above, with an organometallic agent of the formula RMgX wherein R has the meaning assigned before, and X is halogen, contact being maintained at upward of 15° centigrade; (2) hydrolyzing the resulting imine with aqueous mineral acid; and (3) cleaving the constituent ether linkages by heating with aluminum bromide in an inert solvent.

References Cited in the file of this patent

Wagner et al.: Synthetic Organic Chemistry, page 332 (1953).